(12) United States Patent
Otoguro (10) Patent No.: US 8,902,269 B2
(45) Date of Patent: Dec. 2, 2014

(54) OPTICAL SCANNING APPARATUS

(75) Inventor: Yasuaki Otoguro, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 455 days.

(21) Appl. No.: 12/824,091

(22) Filed: Jun. 25, 2010

(65) Prior Publication Data

US 2010/0328413 A1 Dec. 30, 2010

(30) Foreign Application Priority Data

Jun. 30, 2009 (JP) ................................. 2009-155680

(51) Int. Cl.
| | | |
|---|---|---|
| B41J 27/00 | (2006.01) |
| G02B 26/12 | (2006.01) |
| G02B 27/00 | (2006.01) |
| G02B 7/02 | (2006.01) |
| H04N 1/12 | (2006.01) |
| H04N 1/113 | (2006.01) |

(52) U.S. Cl.
CPC ...... G02B 26/125 (2013.01); *H04N 2201/0082* (2013.01); *H04N 1/12* (2013.01); *H04N 1/1135* (2013.01); *G02B 27/0031* (2013.01); G02B 7/028 (2013.01)
USPC ............................ 347/259; 347/257; 347/258

(58) Field of Classification Search
USPC .................................................. 347/257–259
See application file for complete search history.

(56) References Cited

U.S. PATENT DOCUMENTS

| | | | |
|---|---|---|---|
| 5,521,763 A | 5/1996 | Ono et al. |
| 7,453,487 B2 * | 11/2008 | Sato et al. | ...................... 347/257 |
| 2004/0135875 A1 * | 7/2004 | Wakisaka | ...................... 347/238 |
| 2007/0195395 A1 | 8/2007 | Funaki et al. |
| 2008/0273254 A1 * | 11/2008 | Park | ............................. 359/811 |

FOREIGN PATENT DOCUMENTS

| | | | |
|---|---|---|---|
| CN | 101025472 A | | 8/2007 |
| JP | 3-182708 A | | 8/1991 |
| JP | 4-265919 A | | 9/1992 |
| JP | 4340916 A | | 11/1992 |
| JP | 6-300952 A | | 10/1994 |
| JP | 11-326801 A | | 11/1999 |
| JP | 2002-23091 A | | 1/2002 |
| JP | 2005189791 A | | 7/2005 |
| JP | 2005-215494 A | | 8/2005 |
| JP | 2006126569 A | | 5/2006 |
| JP | 2006-184650 A | | 7/2006 |
| JP | 2006184650 A | * | 7/2006 |

* cited by examiner

*Primary Examiner* — Sarah Al Hashimi (74) *Attorney, Agent, or Firm* — Canon USA Inc. IP Division (57) ABSTRACT

An optical scanning apparatus includes a light source configured to emit a light beam, a scanning unit configured to deflect the light beam from the light source so as to scan a photosensitive member, an optical lens configured to guide the light beam scanned by the scanning unit onto the photosensitive member, and a lens supporting unit having a fixing portion configured to fix the optical lens, wherein the lens supporting unit includes a movable supporting portion configured to restrict movement of the optical lens in a direction perpendicular to a scanning direction of the light beam and an optical axis direction of the optical lens, to restrict movement of the optical lens in the optical axis direction, and to support the optical lens movably in the scanning direction.

6 Claims, 7 Drawing Sheets

OPTICAL SCANNING APPARATUS

BACKGROUND OF THE INVENTION

1. Field of the Invention

The present invention relates to an optical scanning apparatus used in an image forming apparatus such as a copying machine, a printer, a facsimile, or a multifunctional peripheral thereof.

2. Description of the Related Art

An electrophotographic image forming apparatus forms an image on a recording medium by making a scan on a photosensitive member by a light beam, developing an electrostatic latent image formed thereby with toner, and transferring and fixing a toner image thereof onto the recording medium. The electrophotographic image forming apparatus is equipped with an optical scanning apparatus to make a scan on the photosensitive member by a light beam. The optical scanning apparatus includes a light source to emit a light beam, a scanning unit (for example, a polygon mirror or rotating polygon mirror, hereinafter called a polygon mirror) to cause the light beam to scan on the photosensitive member by deflecting the light beam emitted from the light source, and an image forming optical system to cause the light beam scanned by the polygon mirror to form an image on the photosensitive member. For the image forming optical system, a scanning speed of the light beam scanning the photosensitive member is stabilized and spot shapes of the light beam formed on the photosensitive member are equalized by one optical lens or a plurality of combined optical lenses.

These optical lenses used for an image forming optical system are mainly formed of resin. Resin lenses have, compared with glass lenses, a disadvantage of being more likely to thermally expand when the temperature rises. However, it is necessary to give special optical characteristics to the optical lenses used for an image forming optical system and thus, optical lenses are formed of resin that is easier to form into special shapes. Moreover, resin lenses can be constructed more inexpensively in terms of cost compared with glass lenses. Due to the above advantages, resin lenses are mostly used as the optical lenses for an image forming optical system.

After the installation position of an optical lens is adjusted by a lens supporting member so that a desired position is scanned by a light beam when installed in an optical scanning apparatus, the optical lens is firmly fixed to the lens supporting member by a fixing member such as an adhesive or screw to hold the position inexpensively with precision (see Japanese Patent Application Laid-Open No. 3-182708).

However, if the optical lens is firmly fixed, issues described below may arise. Heat from a driving device driving the polygon mirror raises the temperature of an optical lens arranged near the polygon mirror, which in turn expands the optical lens thermally. If the optical lens is firmly fixed to the lens supporting member, a portion whose thermal expansion is limited by the fixing and another portion whose thermal expansion is not limited by the fixing arise, thereby distorting the shape of the optical lens and generating a possibility of changing the optical characteristics thereof. Moreover, if the optical lens is fixed to the lens supporting member by an adhesive and a force generated by thermal expansion of the optical lens becomes greater than a restriction part force, there is a possibility that the optical lens peels off from the lens supporting member to change the position of the optical lens.

Confronted with such issues, bringing the thermal expansion amount of the optical lens into line with that of the lens supporting member that fixes and supports the optical lens by bringing the linear expansion coefficient of the optical lens into line with that of the lens supporting member can be considered. Accordingly, even if the temperature of the optical lens and the lens supporting member rises, the optical lens is less likely to be distorted because the difference between both thermal expansion amounts becomes smaller. However, in view of the function of each member, it is very difficult to perfectly match the linear expansion coefficient of the optical lens and that of the lens supporting member. Moreover, the number of revolutions of a rotating polygon mirror is set higher for faster image formation in an image forming apparatus in recent years and thus, when compared with a conventional image forming apparatus, a calorific value from a driving device such as a motor that rotates the rotating polygon mirror during image formation is greater. Therefore, even if the optical lens and the lens supporting member are formed of materials having linear expansion coefficients close to each other, the difference between both thermal expansion amounts becomes greater when the temperature rises, leading to distortion of the optical lens.

SUMMARY OF THE INVENTION

According to an aspect of the present invention, an optical scanning apparatus includes a light source configured to emit a light beam, a scanning unit configured to cause the light beam from the light source to scan onto a photosensitive member, an optical lens configured to guide the light beam scanned by the scanning unit onto the photosensitive member, and a lens supporting unit having a fixing portion configured to fix the optical lens, wherein the lens supporting unit includes a movable supporting portion configured to restrict movement of the optical lens in a direction perpendicular to a direction of movement of the light beam on the optical lens and an optical axis direction of the optical lens, to restrict movement of the optical lens in the optical axis direction, and to support the optical lens movably in the direction of movement of the light beam on the optical lens.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

4B is an enlarged view of the movable supporting portion when viewed from the side on which a light beam enters.

DESCRIPTION OF THE EMBODIMENTS

Various exemplary embodiments, features, and aspects of the invention will be described in detail below with reference to the drawings.

Figure 1A:
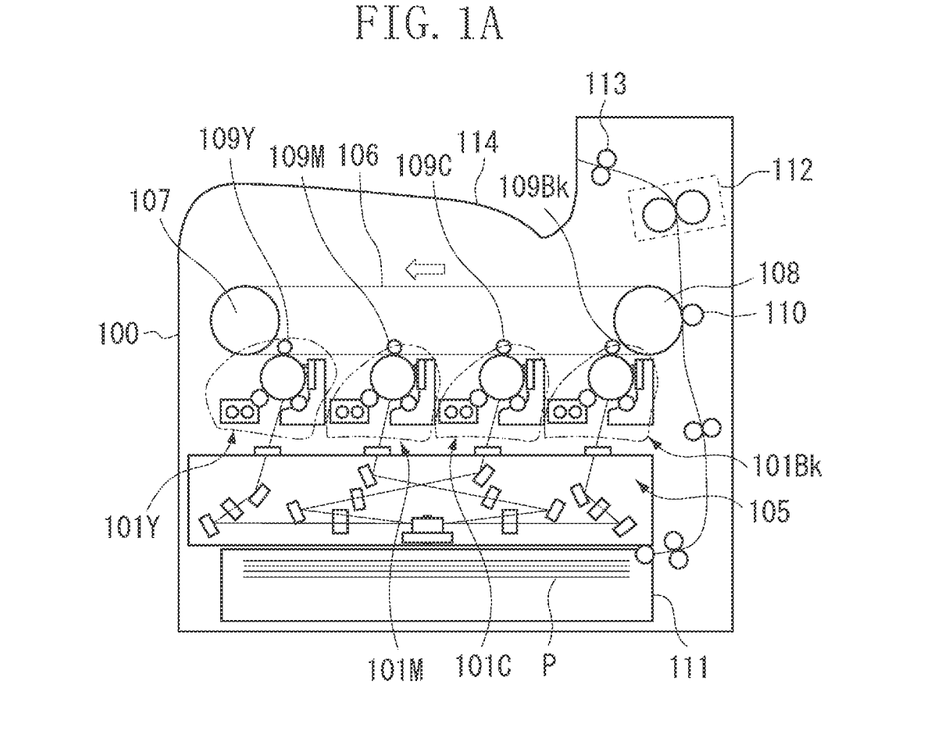
FIGS. 1A and 1B are sectional views of an image forming apparatus according to an exemplary embodiment of the present invention.

FIG. 1A is a sectional view of an image forming apparatus 100 according to a first exemplary embodiment of the present invention. The image forming apparatus 100 includes four image forming units 101Y, 101M, 101C, and 101Bk to form a toner image for each color of yellow, magenta, cyan, and black.

Figure 1B:
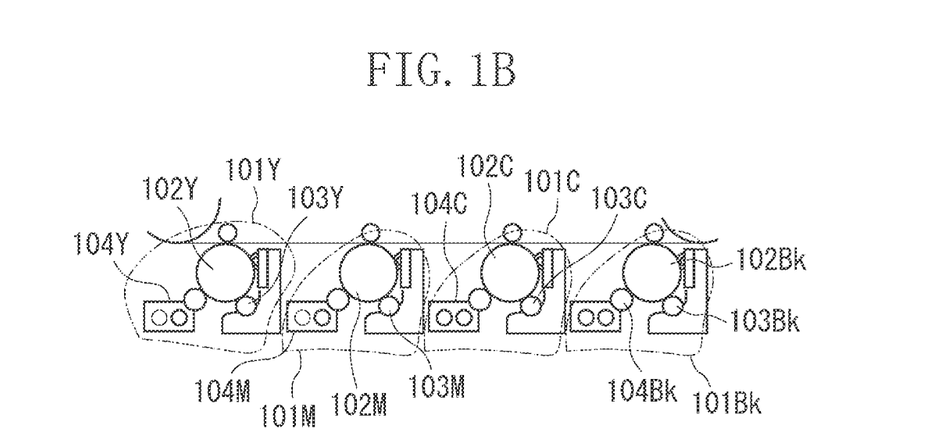

FIG. 1B is an enlarged view of the image forming units. The image forming units 101Y, 101M, 101C, and 101Bk include photosensitive drums 102Y, 102M, 102C, and 102Bk and charging devices 103Y, 103M, 103C, and 103Bk that charge the photosensitive drums 102Y, 102M, 102C, and 102Bk up to a uniform background potential, respectively. The image forming units 101Y, 101M, 101C, and 101Bk also include development devices 104Y, 104M, 104C, and 104Bk that develop electrostatic latent images formed on the photosensitive drums 102Y, 102M, 102C, and 102Bk by an optical scanning apparatus 105, described below, with toner, respectively.

The description returns to FIG. 1A. These four image forming units 101Y, 101M, 101C, and 101Bk are allocated in the order of the image forming unit 101Y that forms a yellow toner image, the image forming unit 101M that forms a magenta toner image, the image forming unit 101C that forms a cyan toner image, and the image forming unit 101Bk that forms a black toner image along a rotation direction of an intermediate transfer belt described below.

The image forming apparatus 100 according to the present exemplary embodiment includes an intermediate transfer belt 106 to which toner images are primarily transferred from the photosensitive drums 102Y, 102M, 102C, and 102Bk of each image forming unit. The intermediate transfer belt 106 is formed in an endless shape and stretched between a pair of belt conveyance rollers 107 and 108 to rotate in an arrow direction in FIG. 1A. A formed toner image is primarily transferred to the intermediate transfer belt 106. Primary transfer rollers 109Y, 109M, 109C, and 109Bk are allocated at positions opposite to the photosensitive drums 102Y, 102M, 102C, and 102Bk (also referred to as 102) of each image forming unit with the intermediate transfer belt 106 being sandwiched therebetween. An electric field is formed between each photosensitive drum and the primary transfer rollers 109Y, 109M, 109C, and 109Bk by applying a predetermined transfer bias voltage to these primary transfer rollers 109Y, 109M, 109C, and 109Bk. Toner bearing charges on each photosensitive drum is multi-transferred to the intermediate transfer belt 106 by a Coulomb force.

A toner image multi-transferred to the intermediate transfer belt 106 is secondarily transferred to a recording sheet P (recording medium P) by a secondary transfer unit. A secondary transfer roller 110 is allocated opposite to the one belt conveyance roller 108 at a secondary transfer position and the toner image is transferred from the intermediate transfer belt 106 after the recording sheet P is inserted between the secondary transfer roller 110 and the intermediate transfer belt 106 that are mutually in contact by pressure.

On the other hand, the recording sheet P is fed from a feeding cassette 111 accommodated in a lower part of a cabinet of the image forming apparatus 100 into the image forming apparatus 100, more specifically to the secondary transfer position where the intermediate transfer belt 106 and the secondary transfer roller 110 are in contact.

After the toner image is transferred at the secondary transfer position, the recording sheet P is fed to a fixing device 112 provided right above the secondary transfer position. Next, the toner image on the recording sheet P is heated and fixed by the fixing device 112 and then the recording sheet P is discharged to a discharge tray 114 provided in an upper part of the cabinet of the image forming apparatus 100 via a discharging roller 113.

Figure 2:
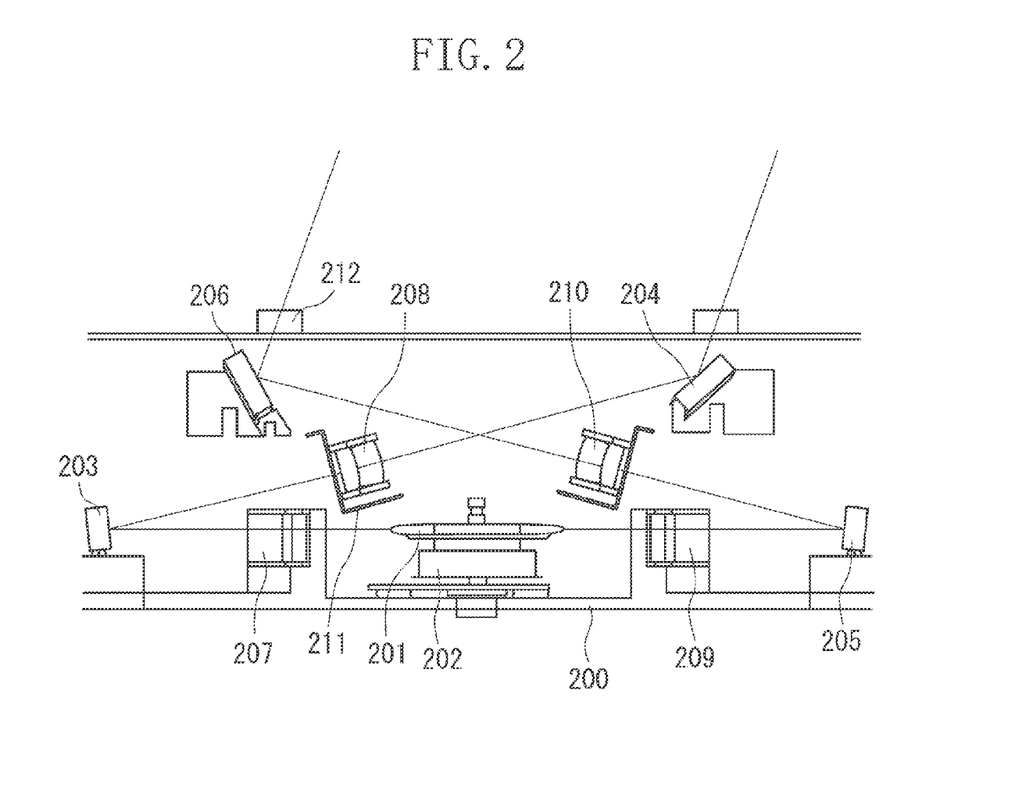
FIG. 2 is a sectional view of an optical scanning apparatus according to an exemplary embodiment of the present invention.

Next, the optical scanning apparatus 105 (scanner unit) will be described. Below the image forming units 101Y, 101M, 101C, and 101Bk, the optical scanning apparatus 105 to expose the photosensitive drums 102 to form an electrostatic latent image according to image information on the photosensitive drums 102 to light is allocated. The optical scanning apparatus 105 forms an electrostatic latent image on the photosensitive drums 102 provided in each of the image forming units 101Y, 101M, 101C, and 101Bk. FIG. 2 is a sectional view of the optical scanning apparatus 105 in the present exemplary embodiment. FIG. 2 is a diagram that enlarges a portion of the optical scanning apparatus 105. A light source unit (not illustrated) in which a light source to emit a light beam is mounted, the polygon mirror 201 to reflect/deflect the light beam, and a driving motor 202 that rotates the polygon mirror 201 are provided in an optical box 200 (cabinet) of the optical scanning apparatus 105. Also, reflecting mirrors 203, 204, 205, and 206 that guide a light beam deflection-scanned by the polygon mirror 201 to the photosensitive drum 102 of each image forming unit and optical lenses 207, 208, 209, and 210 having predetermined optical characteristics are provided. The optical characteristics include a characteristic to cause a light beam to form an image in predetermined spot shapes on the photosensitive drum 102 or a characteristic to correct the scanning speed of the scanned light beam on the photosensitive drum 102 to a fixed speed. Some function is given to the optical lenses 207 and 208 (209 and 210). The optical lens 208 is supported by a lens supporting member 211. The lens supporting member 211 supports/fixes the optical lens inside the optical box 200 in such a way that a light beam to form an image is not blocked.

Next, the path of a light beam when an electrostatic latent image is formed on the photosensitive drum 102M of the image forming unit 101M will be described. The description of the path of a light beam to the photosensitive drums of the other image forming units will not be repeated because only the optical path is different and characteristics of optical lenses through which the light beam passes are the same. A light beam emitted from a light source (for example, a semiconductor laser) based on an image signal for magenta modulated according to image information is deflected by the rotated polygon mirror 201 so as to scan the photosensitive drum. The scanned light beam passes through the optical lens 209 and is then reflected by the reflecting mirror 205. The reflected light beam passes through the optical lens 210 and is then reflected by the reflecting mirror 206 toward a transparent board 212. The light beam passes through the transparent board 212 before reaching the photosensitive drum 102M.

An electrophotographic image forming apparatus guides, as described above, a light beam to the photosensitive drum 102 to form an electrostatic latent image on the photosensitive drum 102. To obtain a high-quality product, it is necessary to stabilize the image formation position of the light beam. Since each of the image forming units 101Y, 101M, 101C, and 101Bk has the same configuration, an explicit description of Y, M, C, and K indicating the toner color will not be repeated in the description below and the exemplary embodiment will be described as the common image forming unit 101.

As described above, however, the driving motor 202 produces heat when the polygon mirror is rotated and driven, and the heat thereof raises the temperature of the optical lenses 207, 208, 209, and 210. Accordingly, there is a possibility that an issue of a changed posture of the optical lenses may arise due to distortion of the optical lenses or peeling of a bonding part.

In the present exemplary embodiment, by contrast, the above issue is solved by supporting the optical lenses 207, 208, 209, and 210 in the following manner.

Figure 3A:
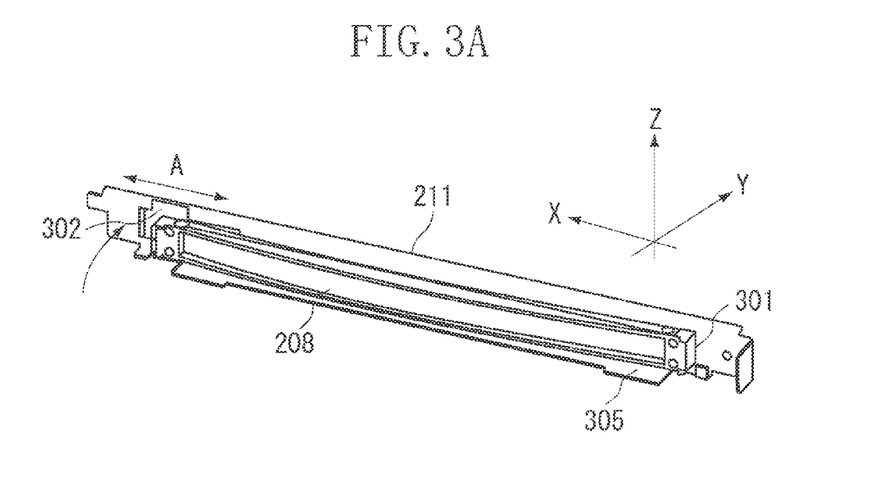
FIG. 3A is a perspective view when an optical lens and a lens supporting member are viewed from the side on which a light beam exits.
Figure 3B:
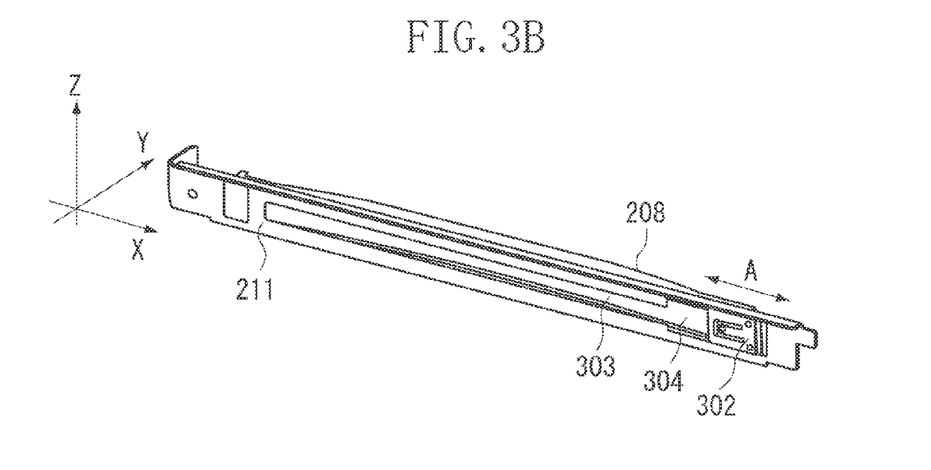
FIG. 3B is a perspective view when the optical lens and the lens supporting member are viewed from the side on which a light beam enters.
Figure 3C:
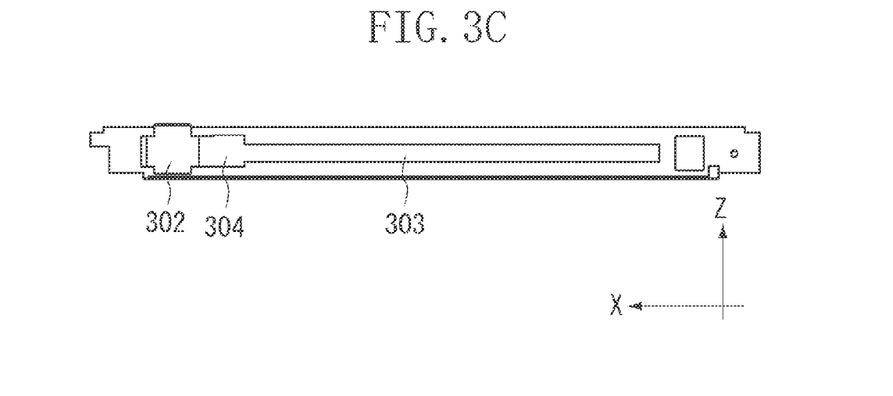
FIG. 3C is a front view when the lens supporting member is viewed from an optical axis direction of the optical lens.

FIGS. 3A to 3C are schematic diagrams illustrating the configuration to support the optical lenses 207, 208, 209, and 210 in the present exemplary embodiment. The optical lens 208 is supported by the lens supporting member 211 (see FIG. 2). FIG. 3A is a perspective view when the optical lens 208 and the lens supporting member 211 are viewed from the side on which a light beam exits. FIG. 3B is a perspective view when the optical lens 208 and the lens supporting member 211 are viewed from the side on which the light beam enters. FIG. 3C is a front view when the lens supporting member 211 is viewed from an optical axis direction of the optical lens 208. The direction of the X-axis in FIGS. 3A to 3C is a longitudinal direction of the optical lens 208 and indicates the direction (main scanning direction, a direction of movement of the light beam on the optical lens 208) in which a scan of the light beam is made. The direction of the Y-axis indicates the above optical axis direction of the optical lens 208. The Z-axis indicates a direction perpendicular to the longitudinal direction and the optical axis direction of the optical lens 208. The optical lens 208 and the lens supporting member 211 supporting the optical lens 208 will be described in the present exemplary embodiment, but the lens supporting member 211 is also applicable to supporting members supporting the optical lenses 207, 209, and 210.

As illustrated in FIG. 3A, the length of the lens supporting member 211 in the X-axis direction is longer than the length of the optical lens 208. The lens supporting member 211 has a fixing supporting portion 301 that fixes and positions the optical lens 208 and a movable supporting portion 302 that supports the optical lens 208 movably in the X-axis direction to the fixing supporting portion 301. The optical lens 208 is fixed to the lens supporting member 211 in the fixing supporting portion 301 by an adhesive or screw. The optical lens 208 is also fixed to the movable supporting portion 302 by a fixing method such as an adhesive or screw. The movable supporting portion 302 is movable with a configuration described below. The fixing supporting portion 301 fixes and supports one end of the optical lens 208 in the X-axis direction. The movable supporting portion 302 supports the other end (the opposite end of the end supported by the fixing supporting portion 301) of the optical lens in the X-axis direction. In other words, one end of the optical lens in the X-axis direction is a fixed end and the other end is a free end to the lens supporting member 211.

As illustrated in FIGS. 3B and 3C, the lens supporting member 211 has a light beam passing hole 303 that allows a scanned light beam to pass therethrough. Also, an opening 304 to connect to the light beam passing hole is provided. The opening 304 is an opening provided to fit the movable supporting portion 302.

Figure 4A:
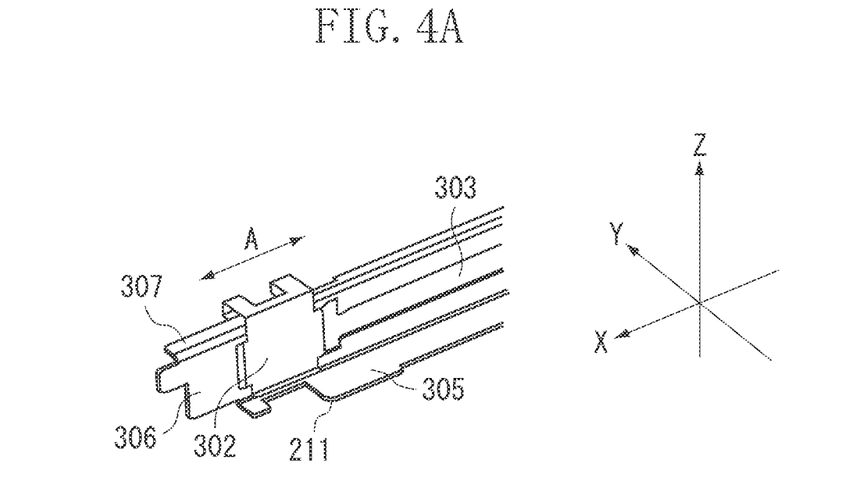
FIG. 4A is an enlarged view of a movable supporting portion and a diagram when the optical lens is removed. FIG.
Figure 4B:
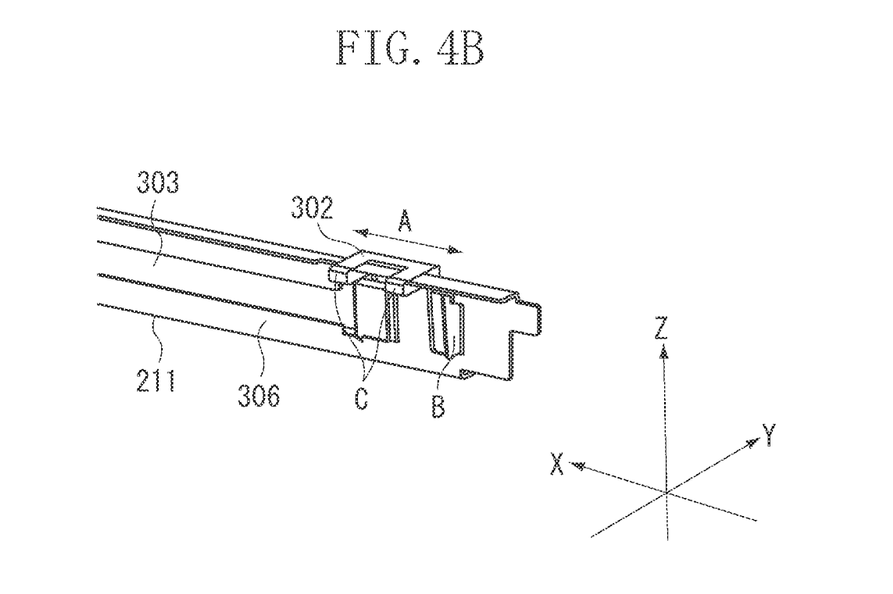

The lens supporting member 211 and the movable supporting portion 302 will be described in more detail with reference to FIGS. 3A to 3C and FIGS. 4A and 4B. FIG. 4A is an enlarged view of the movable supporting portion 302 and a diagram when the optical lens 208 is removed. FIG. 4B is an enlarged view of the movable supporting portion 302 when viewed from the side on which a light beam enters. As illustrated in FIGS. 3A to 3C and FIG. 4A, the lens supporting member 211 is configured with a base part 305 and a raised part 306 raised from the base part 305 and substantially orthogonal thereto. The base part 305 is a part to be mounted in the optical box 200. The raised part 306 has the light beam passing hole 303 provided therein. Also, a bend part 307 bent in the Y direction is configured in the raised part 306. The movable supporting portion 302 is fitted into the opening 304 provided in the raised part 306 and configured to be slidable (an arrow A in FIGS. 3A, 3B, 4A, and 4B) in the X-axis direction along the opening 304. As illustrated in FIG. 4B, the movable supporting portion 302 is configured so that a portion thereof is in contact with a back side of the raised part 306 (a part B in FIG. 4B) and therefore, the raised part 306 is fastened by a fastening part C and contact parts thereof. More specifically, the raised part 306 and the bend part 307 are fastened by a flat surface of the movable supporting portion 302 that is in contact with the raised part 306, as illustrated in FIG. 4A, and the fastening part C in contact with the bent part 307 in the Y-axis direction. Thus, the optical lens 208 does not separate from the raised part 306 in the Y-axis direction.

When the optical lens 208 thermally expands, the movable supporting portion 302 slides in the X-axis direction away from the fixing supporting portion 301 following the thermal expansion of the optical lens 208. In contrast, when the optical lens 208 contracts with the temperature of the optical lens 208 falling, the movable supporting portion 302 slides in the X-axis direction towards the fixing supporting portion 301. That is, the movable supporting portion 302 is movable according to expansion and contraction of the optical lens 208. A portion of the movable supporting portion 302 fitted into the opening 304 is fitted with a force that allows the movable supporting portion 302 to slide inside the opening 304.

As illustrated in FIG. 4B, the movable supporting portion 302 has the fastening part C (restriction part) that fastens the bend part 307 of the lens supporting member 211 from both sides in the Z direction. In other words, the fastening part C is provided so that the movable supporting portion 302 does not separate from the lens supporting member 211 or move in the Z-axis direction due to vibration or when the optical lens 208 contracts. That is, movement of the movable supporting portion 302 in the Z direction is restricted by the fastening part C. Accordingly, a light beam is always incident on a predetermined position for the optical lens in the Z direction and therefore, the irradiation position of the light beam and spot shapes on the photosensitive members can fixed. Incidentally, the fastening part C fastens the bend part 307 with a force that allows the movable supporting portion 302 to slide along the X-axis direction, but without imposing stress on the optical lens.

As has been described in the foregoing, the lens supporting member 211 included in an optical scanning apparatus according to the present exemplary embodiment has the fixing supporting portion 301 that fixes and supports one end of the optical lens 208 and the movable supporting portion 302 that movably supports the other end of the optical lens 208. By adopting such a configuration, even if the optical lens thermally expands due to a rising temperature of the polygon mirror 201 or the driver thereof, the movable supporting portion 302 moves in a direction away from the fixing supporting portion 301 in the longitudinal direction of the optical lens according to the thermal expansion of the optical lens 208. The movable supporting portion 302 is therefore configured so that movement of the optical lens 208 in the optical axis direction (Y-axis direction in FIGS. 3A and 3B) is restricted, and movement of the optical lens 208 in a direction (Z direction in FIGS. 3A to 3C) perpendicular to the optical axis direction and perpendicular to the scanning direction of a light beam is also restricted. In other words, the movable supporting portion 302 allows movement of the optical lens 208 only in the longitudinal direction (X-axis direction in FIGS. 3A to 3C) of the lens, and that movement is based on the thermal expansion of the lens. Accordingly, when the optical lens 208 thermally expands, the optical lens 208 is deformed (expands) in the scanning direction to restrict bending of the optical lens 208 so that distortion of the optical lens 208 is reduced. Further, a configuration in which the optical lens 208 is supported without the whole bottom of the optical lens being bonded can be adopted and therefore, the optical lens 208 is made harder to separate from the lens supporting member 211 when the optical lens 208 thermally expands.

The present exemplary embodiment has been described by assuming that the lens supporting member 211 is an element separate from the optical box 200 (cabinet) of the optical scanning apparatus 105, but the lens supporting member 211 and the optical box 200 may be configured integrally. Moreover, the fixing supporting portion 301 may be provided at a position corresponding to the vicinity of the center of the optical lens 208, and the movable supporting portion 302 may be provided at both ends of the optical lens in the longitudinal direction.

In a second exemplary embodiment of the present invention, arrangement relationships between fixing supporting portions and movable supporting portions in a plurality of optical lenses when the plurality of optical lenses is provided on an optical path between the polygon mirror 201 and the photosensitive drum 102 are considered. The second exemplary embodiment is characterized in that if each of the plurality of optical lenses is supported by the support method in the first exemplary embodiment, the fixing supporting portion of each optical lens is arranged on the same side in the X-axis direction. In such a case, the movable supporting portion of the optical lens is arranged on the same side in the X-axis direction. The configuration thereof will be described below with reference to FIGS. 5A to 5C.

Figure 5A:
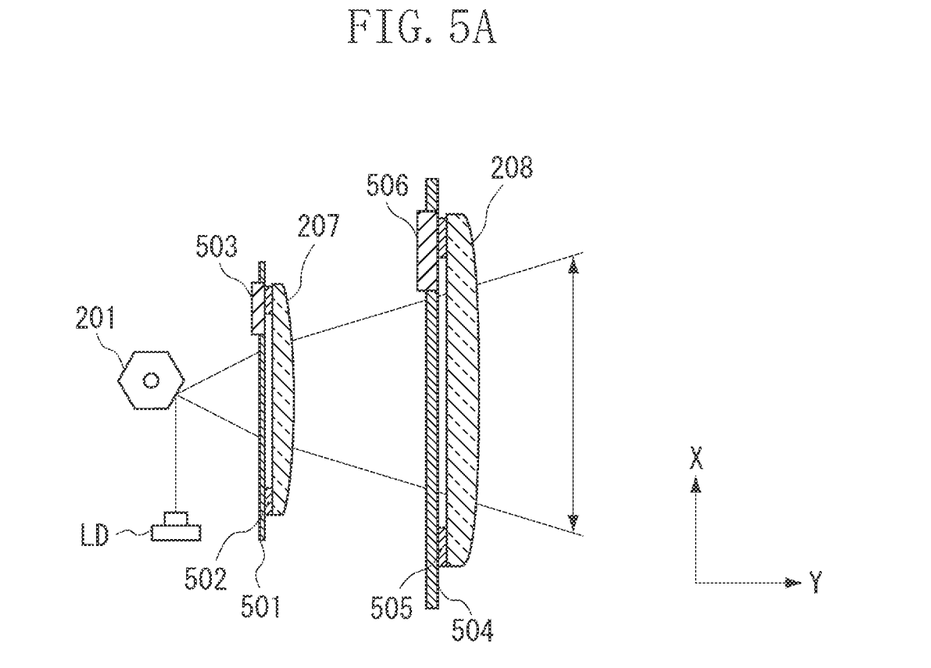
FIGS. 5A to 5C are diagrams illustrating arrangement relationships between fixing supporting portions and movable supporting portions provided in a plurality of optical lenses.

FIG. 5A is a diagram illustrating arrangement relationships between a first fixing supporting portion 502 and a first movable supporting portion 503 provided in a lens supporting member 501 supporting the optical lens 207 and a second fixing supporting portion 505 and a second movable supporting portion 506 provided in a lens supporting member 504 supporting the optical lens 208. The reflecting mirror 203 is originally arranged, as illustrated in FIG. 2, between the optical lens 207 and the optical lens 208, but in FIG. 5A, the polygon mirror 201 and the optical lenses 207 and 208 are expanded in a plane to simplify the description. This also applies to FIGS. 5B and 5C described below.

If the optical lenses 207 and 208 are supported according to the support method in the first exemplary embodiment, as illustrated in FIG. 5A, the first fixing supporting portion 502 and the second fixing supporting portion 505 are arranged on the same side in the X-axis direction. In the traveling direction of a light beam emitted from a light source laser diode (LD) and scanned by the polygon mirror 201, for example, the first fixing supporting portion 502 and the second fixing supporting portion 505 are arranged on the right side and the first movable supporting portion 503 and the second movable supporting portion 506 on the left side.

If a reflecting mirror is present between the optical lens 207 and the optical lens 208, the first fixing supporting portion 502 is arranged on the right side of the traveling direction of a light beam passing through the optical lens 207. On the other hand, the second fixing supporting portion 505 is arranged on the left side of the traveling direction of a light beam passing through the optical lens 208.

That is, the first fixing supporting portion 502 and the second fixing supporting portion 505 are arranged on the same side of the optical axis of the optical lens 207 or the optical lens 208 when viewed from the polygon mirror 201. That is, the first fixing supporting portion 502 and the second fixing supporting portion 505 are arranged on the same side of a surface containing the optical axis of the optical lens 207 or the optical lens 208 and perpendicular to the X axis (scanning direction).

With this configuration, even if the optical lens 207 (first optical lens) and the optical lens 208 (second optical lens) thermally expand or contract, deformation directions of both optical lenses are the same so that a shift of the optical axis of both optical lenses can be reduced to a minimum. With the shift of the optical axis being thereby reduced to a minimum, the optical path of a light beam can be stabilized so that image quality degradation due to thermal expansion of the optical lenses can be reduced. In a color image forming apparatus in which an optical scanning apparatus is provided in each of a plurality of photosensitive drums, each optical lens is supported by the above method. Accordingly, the direction of each color magnification fluctuation is also the same when the lenses contract, so that a relative color misregistration between colors can be minimized.

Figure 5B:
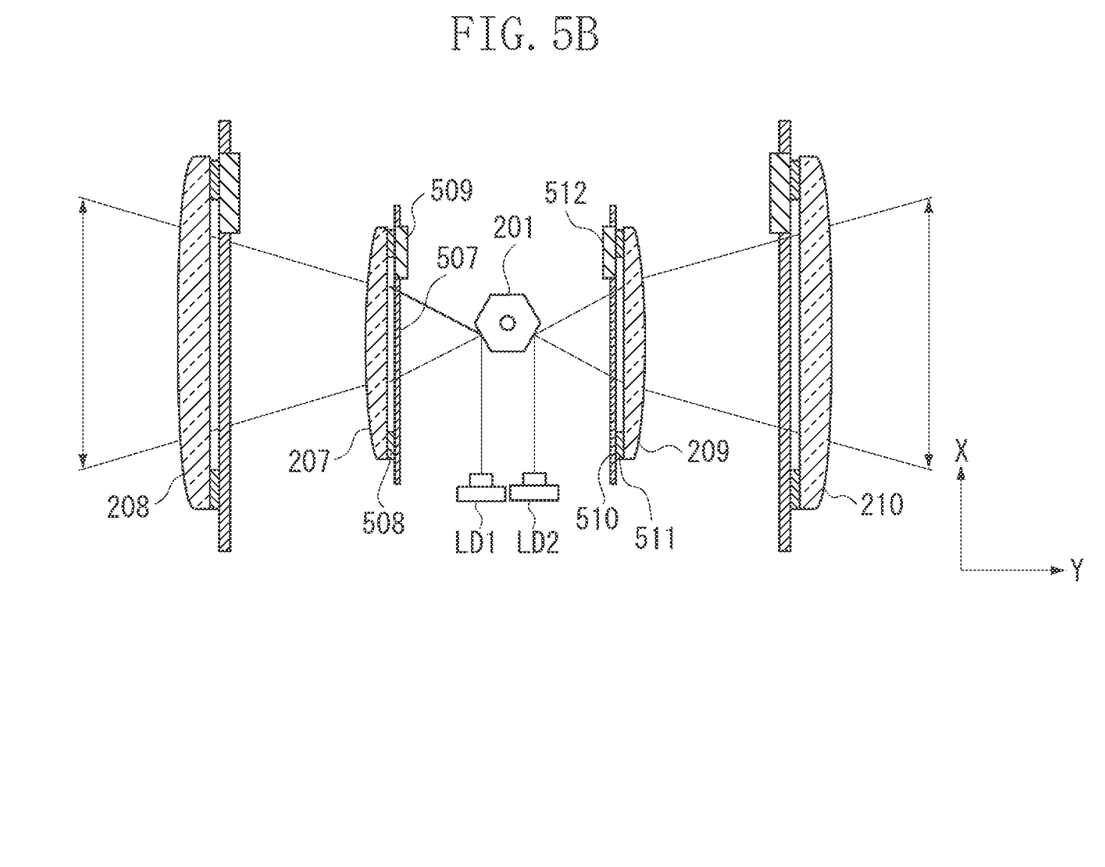

In an optical scanning apparatus of the opposite scanning mode like an image forming apparatus illustrated in FIG. 1A a deflection scan of two light beams emitted. FIG. 5B illustrates a configuration in which a first light source LD1 and a second light source LD2 emit respective light beams that are deflected by one polygon mirror 201 in two opposite directions. In this case, the polygon mirror 201, fixing supporting portions and movable supporting portions are arranged as described below. As illustrated in FIG. 5B, in an optical scanning apparatus of the opposite scanning mode, the two light beams are deflected by the polygon mirror 201 in two mutually opposite directions. Accordingly, the two light beams are scanned in both of the mutually opposite directions. A fixing supporting portion 508 of a lens supporting member 507 (first lens supporting member) supporting the optical lens 207 (first optical lens) that allows a first light beam to pass therethrough is arranged on the left side of the traveling direction of the first light beam and a movable supporting portion 509 is arranged on the right side thereof. On the other hand, a fixing supporting portion 511 of a lens supporting member 510 (second lens supporting member) supporting the optical lens 209 (second optical lens) that allows a second light beam deflection-scanned to the opposite side of the first light beam to pass therethrough is arranged on the right side of the traveling direction of the second light beam and a movable supporting portion 512 is arranged on the left side thereof. If a reflecting mirror is present between the optical lens 207 and the optical lens 208, and between the optical lens 209 and the optical lens 210, arrangement relationships will be like those described with reference to FIG. 5A. Accordingly, the direction of each color magnification fluctuation is also the same when the lenses contract or expand so that a relative color misregistration between colors can be minimized.

Figure 5C:
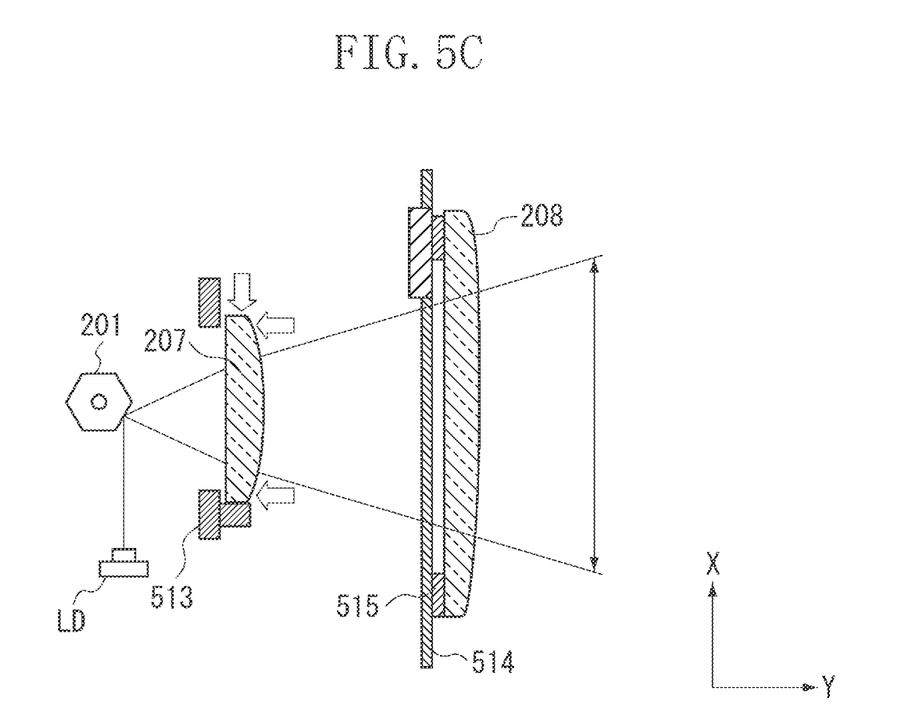

FIG. 5C illustrates a configuration in which a first lens is supported by being pressed against a portion of the cabinet and a second lens is supported by the support structure of the first embodiment. More specifically, as illustrated in FIG. 5C, the optical lens 207 (first lens) may be supported by being pressed in an arrow direction and a direction perpendicular thereto. The optical lens 207 may be pressed by a pressing member, such as a spring or the like, so as to abut ends of the optical lens 207 in the longitudinal direction of the lens against a portion of the cabinet. The optical lens 208 (second lens) can be supported by the support method according to the first exemplary embodiment.

The optical lens 207 is arranged closer to the polygon mirror 201 than the optical lens 208 on the optical path of a light beam emitted by the light source LD. The width of scanning of the optical lens 207 by the light beam is narrower than that of scanning of the optical lens 208. Accordingly, the optical lens 207 is smaller than the optical lens 208 in size in the longitudinal direction of the lens and has a smaller amount of expansion or contraction in the longitudinal direction when the temperature of the optical lenses fluctuates. Thus, the optical lens 207 can adequately be supported even by the fixing support method with a spring or the like, and the precision necessary for image formation can be met. If an urging force of the spring is too strong, however, the optical lens 207 may be distorted, leading to altered optical characteristics. If, on the other hand, an urging force of the spring is too weak, there is a possibility that the optical lens deviates from a predetermined position where the optical lens should be arranged when the optical lens expands or contracts. Thus, this support method may not be recommended for supporting lenses with a large thermal expansion amount.

In the configuration of FIG. 5C, an abutting part 513 and fixing supporting portion 515 of a lens supporting member 514 are arranged on the same side of the optical axis of the optical lens 207 or the optical lens 208 when viewed from the polygon mirror 201. Accordingly, even if the optical lenses 207 and 208 thermally expand or contract, deformation directions of both optical lenses are the same so that a shift of the optical axis of both optical lenses can be reduced to a minimum.

As has been described in the second embodiment, by setting positions of the fixed end and the free end of an optical lens in the same direction to the optical axis of the optical lens in the longitudinal direction of the optical lens for a plurality of optical lenses, a shift of the optical axis between optical lenses can be reduced even if the optical lenses thermally expand or contract. Thus, image quality degradation due to a shift of the optical axis can be reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-155680 filed Jun. 30, 2009, which is hereby incorporated by reference herein in its entirety.

What is claimed is:

1. An optical scanning apparatus comprising:
   a light source configured to emit a light beam;
   a deflecting unit configured to deflect the light beam from the light source such that the light beam scans a photosensitive member;
   an optical lens configured to guide the light beam deflected by the deflecting unit onto the photosensitive member;
   a lens supporting unit having a fixing portion to which a first end of the optical lends in a longitudinal direction thereof is fixed, and
   a movable supporting portion to which a second end of the optical lens in the longitudinal direction thereof is fixed by adhesive,
   wherein the movable supporting portion is attached to the lens supporting unit such that a movement of the movable supporting portion is restricted in a direction perpendicular to both of the longitudinal direction of the optical lens and an optical axis direction of the optical lens, the movement of the movable supporting portion is restricted in the optical lens, the movement of the movable supporting portion is restricted in the optical axis direction of the optical lens, and the movable supporting portion moves in the longitudinal direction of the optical lens by movement of the second end of the optical lens fixed in the longitudinal direction of the optical lens.

2. The optical scanning apparatus according to claim 1, further comprising:
   a second optical lens configured to guide onto the photosensitive member the light beam which has passed through the optical lens;
   a second lens supporting unit having a fixing portion to which a first end of the second optical lens in a longitudinal direction thereof is fixed, and
   a second movable supporting portion to which a second end of the second optical lens in the longitudinal direction thereof is fixed by adhesive,
   wherein the second movable supporting portion is attached to the second lens supporting unit such that a movement of the second movable supporting portion is restricted in a direction perpendicular to both of the longitudinal direction of the second optical lens and an optical axis direction of the second optical lens, the movement of the second movable supporting portion is restricted in the optical axis direction of the second optical lens, and the second movable supporting portion moves in the longitudinal direction of the second optical lens by movement of the second end of the second optical lens fixed in the longitudinal direction of the second optical lens, and,
   wherein the fixing portion of the lens supporting unit and the fixing portion of the second lens supporting unit are arranged on a same side of an optical axis of the optical lens in the longitudinal direction of the optical lens.

3. The optical scanning apparatus according to claim 1, further comprising:
   a second light source that is different from the light source and configured to emit a second light beam;
   a second optical lens configured to guide the second light beam emitted from the second light source and deflected by the deflecting unit in a direction different from the direction of the light beam emitted from the light source onto a second photosensitive member different from the photosensitive member; and
   a second lens supporting unit having a fixing portion to which a first end of the second optical lens in a longitudinal direction thereof is fixed; and
   a second movable supporting portion to which a second end of the second optical lens in the longitudinal direction thereof is fixed by adhesive,
   wherein the second movable supporting portion is attached to the second lens supporting unit such that a movement of the second movable supporting portion is restricted in a direction perpendicular to both of the longitudinal direction of the second optical lens and an optical axis direction of the second optical lens, the movement of the second movable supporting portion is restricted in the optical axis direction of the second optical lens, and the second movable supporting portion moves in the longitudinal direction of the second optical lens by movement of the second end of the second optical lens fixed in the longitudinal direction of the second optical lens, and wherein the fixing portion of the lens supporting unit and the fixing portion of the second lens supporting unit are arranged on a same side of an optical axis of the optical lens in the longitudinal direction of the optical lens.

4. The optical scanning apparatus according to claim 1, wherein the optical lens is fixed to the fixing portion by adhesive.

5. The optical scanning apparatus according to claim 1, wherein the lens supporting unit has an opening in which the movable supporting unit fits such that the lens supporting portion is slidable in the longitudinal direction of the optical lens.

6. An image forming apparatus comprising:
the optical scanning apparatus according to claim 1;
the photosensitive member scanned by the light beam emitted from the optical scanning apparatus; and
an image forming unit configured to develop an electric latent image with toner, and transfer a toner image developed with the toner onto a recording medium.

* * * * *